United States Patent [19]

Wilkinson

[11] 4,441,332

[45] Apr. 10, 1984

[54] ABSORPTION REFRIGERATION AND HEAT PUMP SYSTEM

[75] Inventor: William H. Wilkinson, Upper Arlington, Ohio

[73] Assignee: Gas Research Institute, Chicago, Ill.

[21] Appl. No.: 446,885

[22] Filed: Dec. 6, 1982

[51] Int. Cl.³ .................................................. F25B 27/02
[52] U.S. Cl. ..................................... 62/238.3; 62/148;
62/325; 62/332; 62/335; 62/476
[58] Field of Search ................. 62/148, 159, 325, 335,
62/238.3, 476, 332, 79, 101

[56] References Cited

U.S. PATENT DOCUMENTS

| | | | |
|---|---|---|---|
| 2,350,115 | 5/1944 | Katzow | 62/79 |
| 3,483,710 | 12/1969 | Bearint | 62/79 |
| 3,824,804 | 7/1974 | Sandmark | 62/238.3 |
| 4,100,755 | 8/1978 | Leonard | 62/238.3 X |
| 4,199,959 | 4/1980 | Wurm | 62/325 X |

Primary Examiner—Lloyd L. King

Attorney, Agent, or Firm—Robert B. Watkins; Philip M. Dunson

[57] ABSTRACT

An absorption refrigeration and heat pump system in which a higher temperature subsystem and a lower temperature subsystem are combined with the desorber means of the higher temperature subsystem in heat exchange relationship with the condenser means of the lower temperature subsystem, and in which the evaporators of each subsystems are in heat exchange relationship with either the load in one mode of operation or the heat sink in another mode of operation, and the absorbers and condenser of the lower temperature subsystem are in heat exchange relationship with the heat sink in the first mode of operation and with the load in the other mode of operation. Means are provided to balance the system including a condensate pump between the higher temperature condenser and the higher temperature desorber. Alternate means are provided to improve lower temperature heat pumping by restricting the refrigerant flow through one of the expansion valves and diverting it to the solution pump.

10 Claims, 9 Drawing Figures

ABSORPTION REFRIGERATION AND HEAT PUMP SYSTEM

SUMMARY OF THE INVENTION

This invention relates to an absorption refrigeration/heat pump system which comprises a higher temperature subsystem and a lower temperature subsystem with various components of the subsystems in heat exchange relationship with one another to provide greater performance than usually obtainable in such systems and/or to permit the use of fluids that have been unsatisfactory in conventional systems. More particularly, it relates to an absorption refrigeration or heat pump system comprising a higher temperature subsystem and a lower temperature subsystem in which the higher temperature condenser is in a heat exchange relationship with the lower temperature desorber and the heating and/or cooling loads are arranged to exchange heat with various combinations of the other components of the system.

Briefly and in summary, the invention comprises an absorption refrigeration and heat pump system constructed to provide heat to or remove heat from a load when the ambient heat sink or source of heat is above about 45° F. comprising at least one first subsystem for operation at higher temperature and at least one second subsystem for operation at lower temperature relative to the first subsystem, each subsystem having components of absorber means, desorber means, condenser means, and evaporator means operatively connected together, with a condenser means of the higher temperature subsystem in heat exchange relationship with the desorber means of the lower temperature subsystem; with the evaporator of the higher temperature subsystem and the evaporator of the lower temperature subsystem in series heat exchange relationship with the load in the cooling mode or with the ambient in the heating mode; and with the absorber of the higher temperature subsystem, the condenser of the lower temperature subsystem, and the absorber of the lower temperature subsystem in series heat exchange relationship with the sink in the cooling mode and the load in the heating mode.

When operated with the heat sink or source of heat below 45° F., the evaporator of the higher temperature subsystem is placed in heat exchange relationship with the condenser of the lower temperature subsystem and means is provided to balance the system.

An additional feature of the invention includes means to pump liquid refrigerant from the condenser of the higher temperature subsystem to the desorber of the higher temperature subsystem to balance the evaporator of the higher temperature subsystem heating requirement with the heating requirement of the condenser of the lower temperature subsystem.

Absorption refrigeration and heat pump systems are well known and their basic operating characteristics need little further description except to establish the definitions and context in which this invention will be later described.

In a typical system water is a refrigerant dissolved in a lithium bromide/water solution, often called the "solution pair". Water is absorbed in the lithium bromide solution to varying degrees throughout the sytem and the heat of absorption is added or extracted to produce heating and cooling effects.

The solution pair enters a generator where it is subjected to heat. The applied heat desorbs the refrigerant water in the form of vapor which is conveyed to the condenser. There, external ambient cooling condenses the water vapor to liquid, which is conveyed through an expansion valve, into an evaporator where heat is absorbed. In the refrigeration system the heat absorbed in the evaporator is from the cooling load.

The low pressure vapor then passes to an absorber where ambient cooling allows the lithium bromide solution to absorb the water vapor. The solution pair is then conveyed to a recuperator by a pump. The recuperator is a counter flow heat exchanger where heat from the absorbent, lithium bromide/water solution, flowing from the generator to the absorber, heats the returning solution pair flowing from the absorber to the generator. In the heating cycle, the cooling applied at the absorber and/or the condenser is the heat delivery to the heating load.

As a matter of convenience and terminology, each part of the aborption system, which operates at the same pressure, is termed a chamber.

Conventional absorption refrigeration and heat systems are two-chamber systems. When operated as a heat pump they give respectable heating performance but give extremely poor cooling performance. Using ammonia ($NH_3$) as the refrigerant and water ($H_2O$) as the sorbent, heat pumping can occur from an ambient air source which is at temperatures below freezing. In a theoretical assessment where the air is treated as if it were dry so that no defrosting is necessary, the typical two chamber $NH_3/H_2O$ heat pump would represent a significant improvement over what would be expected of a simple furnace. However, since heat pumps are more expensive than a furnace, cooling season performance benefits are needed to justify the added expense. In other words, the heat pump must act as an air conditioner also to offset the cost of a separate installation of an air conditioner with the furnace. For cooling, an $NH_3/H_2O$ system is predicted to have a performance factor, PF (PF=cooling effect/combustion heat input) equal to about 0.46. This low performance index causes unreasonable fuel (or energy) costs from excessive fuel (or energy) use. This low performance of the ammonia/water system results from the poor performance characteristics of the ammonia/water solution at the higher temperature ranges if the heat is supplied to the absorption system at higher temperatures.

Three-chamber systems of various types have been suggested which would improve the performance by staging the desorption process into effects. This would allow for increasing the actual temperature in which the driving heat is added to the system (cycle). The reference Carnot cycle efficiency would be increased and the real cycle would follow suit. However again this increase in temperature would represent an unreasonably high pressure for ammonia/water systems and would force the system to operate in regions for which data is not readily available. Extrapolations estimate a peak cycle temperature of about 400° F. for an air conditioning case with a 35° F. evaporator and much higher for a heat pump case with a lower evaporator temperature.

In addition the pressure and toxicity tend to rule out ammonia/water in a three-chamber system. The search for organic material such as halogenated hydrocarbons and other refrigerants as a replacement for the ammonia has been limited by fluid stability at these higher temperatures. Normal organic refrigerant stability tests anticipate that it is necessary for oil to be present for operation in vapor compression refrigeration systems. These high operating temperatures rule out most of the common refrigerants, particularly when being heated directly by combustion products which often cause local hot spots, which result in working fluid degradation and/or corrosion of components.

The subsystem of this invention employs four chambers. Two chambers are operatively connected in one two-chamber subsystem and two other chambers are operatively connected in another subsystem.

One subsystem employs a higher temperature solution pair having good higher temperature performance properties, preferably lithium bromide/water with water as the refrigerant and lithium bromide as the absorbent. The other subsystem employs a different solution pair, preferably ammonia/water, with ammonia as the refrigerant and water as the absorbent. The first mentioned subsystem is operated at higher temperatures and the system configuration allows the pair to be selected to avoid freezing and crystalization problems. The other, second, subsystem employs a lower temperature solution pair having good low temperature performance properties and is operated at lower temperatures in the range where an organic should be expected to operate successfully without toxicity corrosion or stability problems and where temperatures below freezing are acceptable.

The first subsystem and the second subsystem; i.e., higher temperature and the lower temperature subsystem respectively, are operatively combined and connected by placing the higher temperature condenser in heat exchange relationship with the lower temperature desorber with other components of the total system also combined in a new and novel way as will be later described.

In the prior art, others have associated various components of absorption refrigeration/heat pump systems in various ways with the purpose of improving the performance or otherwise enhancing the operation of these systems. These other prior art systems have met with varying degrees of success but have apparently not obtained all objectives and are capable of further improvement as provided by this invention.

In the prior art, U.S. Pat. No. 2,350,115—Katzaw describes what may be termed a four-chamber system that employs some of the characteristics of the applicant's invention but which fails to recognize the advantages of providing an arrangement that recombines and redirects the heating and cooling effects of the uncontrolled ambient atmosphere, as well as the controlled/conditioned atmospheres or loads.

U.S. Pat. No. 3,483,710—Bearint, is another example of a prior art version of a four-chamber system that combines a higher temperature subsystem with a lower temperature subsystem. As disclosed in the previous patent to Katzaw, although the advantage of placing the higher temperature condenser in heat exchange relationship with lower temperature desorber is revealed, the interrelationships between other components are not the same or arranged to the same advantage as the applicant's invention. This is especially to be noted in connection with the arrangement of various elements with regard to ambient atmosphere conditions and the conditioned atmosphere/or load.

It is a purpose of this invention to combine the components of the separate subsystems of the four-chamber system to provide an absorption refrigeration and/or heat pump total system that is capable of either a higher coefficient of performance or of being manufactured with efficiencies without reducing performance, and without resorting to continued search for an ideal fluid pair.

Other objectives and features of the invention will be apparent and understood from the detailed description and the accompanying drawings which follow.

DETAILED DESCRIPTION OF THE INVENTION

In a description of this invention, it is important that clear distinction be made between solutions entering and leaving various components. Therefore, adopted herein is the notation of the standard setting body on absorption systems in the U.S., the ASHRAE Technical Committee (8.3) on Absorption Machines. Their notation is given in the following quote from the ASHRAE 1979 Equipment Handbook, Chapter 14:

"To avoid confusion of terminology in the absorption field, ASHRAE Technical Committee (8.3) recommends the following standardized terms for the absorbent-refrigerant solution. Weak absorbent is that solution which has picked up refrigerant in the absorber and is then weak in its affinity for refrigerant. Strong absorbent is that solution which has had refrigerant driven from it in the generator and, therefore, has a strong affinity for refrigerant."

Figure 1:
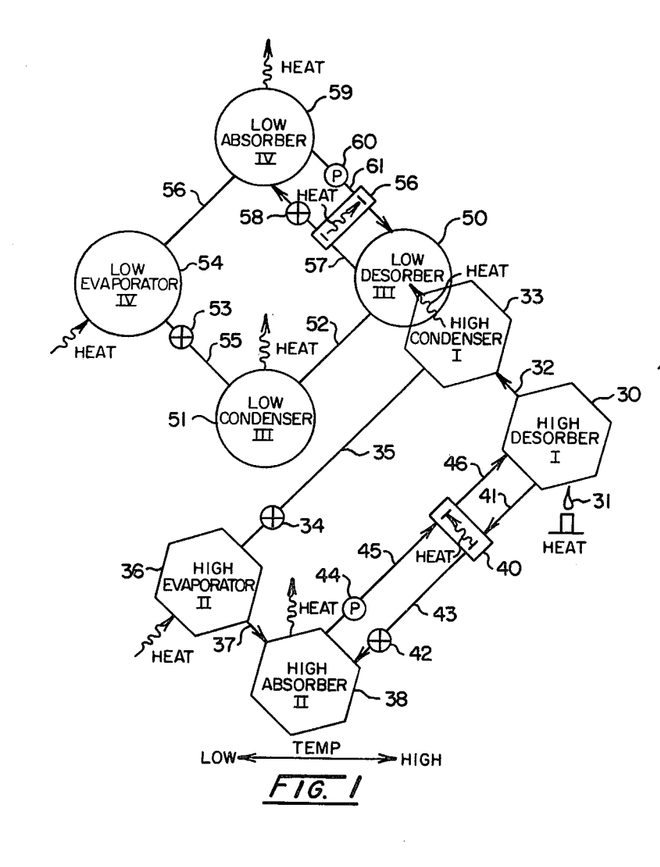
FIG. 1 is a schematic representation of the arrangements of the various components of the system of this invention in the air conditioning and warm ambient heat pump mode of operation.

In the schematic representation of FIG. 1, the hexagonal blocks represent the components of the first subsystem of the invention and the circles represent the components of the second subsystem. The first subsystem may be interchangeably termed the "high" subsystem and the second, the "low" subsystem. Components of each may be termed in the same manner, respectively.

In the preferred embodiment of the invention, in the first (high) subsystem the water is the refrigerant and lithium bromide (LiBr) is the absorbent.

The higher temperature desorber 30 of the first subsystem is heated by a flame 31 or other means such as electricity. The desorber 30 is connected by a suitable conduit 32 to a higher temperature condenser 33. The conduit 32 carries superheated refrigerant vapor to the condenser 33. Heat extracted from the condenser causes the refrigerant to condense to a liquid.

The condenser 33 is connected to an expansion valve 34 by a conduit 35 which carries the condensed liquid refrigerant.

Expansion valve 34 is connected to a high evaporator 36 where the low pressure refrigerant vaporizes as it extracts heat from the ambient surroundings. The vaporized refrigerant is conveyed by conduit means 37 to a high absorber 38 where it weakens the strong solution supplied to the absorber 38 from conduit 43 through expansion valve 42.

In the high subsystem, the desorber 30 is connected to a recuperator 40 by conduit means 41. The recuperator 40 is connected to an expansion valve 42 and to the absorber 38 by a conduit means 43. The absorber 38 is connected through a pump 44 to the recuperator 40 by a conduit means 45 and the recuperator 40 is connected back to the desorber 30 by a conduit means 46. In this part of the subsystem strong absorbent solution is carried from the desorber 30 through the recuperator 40 to the absorber 38 where it absorbs refrigerant and the resulting weak solution is pumped through the recuperator 40 to the desorber 30. Heat is exchanged between the strong absorbent and the weak absorbent solutions in the recuperator 40.

In the above described manner the two-chamber I,II, higher temperature, first subsystem operates in a typical generally conventional manner.

The solution pair used in chambers III and IV of the second (lower temperature) subsystem is preferably ammonia and water, with ammonia as the refrigerant and water as the sorbent.

Combined with the condenser 33 in heat exchange relationship is a desorber 50 which is connected to a condenser 51 by conduit means 52. Conduit 52 may include rectifier sections as typically needed when a volatile sorbent, such as water, is used in a lower temperature solution system, comprising chambers III and IV.

Condenser 51 is connected through an expansion valve 53 to an evaporator 54 by a conduit means 55. Evaporator 54 is connected to an absorber 59 by a conduit means 56 and the exit from the desorber 50 is connected to recuperator 56 by a conduit 57 which continues through an expansion valve 58 to the absorber 59. Through a pump 60, the exit from the absorber 59 is connected through the recuperator 56 to the desorber 50 through conduit means 61.

In operation, ammonia refrigerant vapor is driven from the desorber 50 by heat from the condenser 33 and passes through the conduit means 52 to the condenser 51. In condenser 51 heat is given up to a cooling medium, and the liquid refrigerant is carried to the expansion valve 53 where it expands into the evaporator and becomes vapor as it receives heat from an external source. The refrigerant vapor is carried to the absorber 59 where heat is given up to a sink and refrigerant is absorbed in a strong absorbent solution supplied to the absorber 59 from expansion valve 58. The weakened absorbent solution is pumped back to the desorber 50, being warmed by heat exchange in the recuperator 56.

Throughout the continued detailed description, the invention is described in the context of refrigeration and heat pumping for the purpose of heating and cooling the environmental atmosphere of living space in a building or other shelter. This "heating and air conditioning" application of the invention is an essential and important use but it should be understood that in the broader sense the invention may be applicable in any circumstance where cooling or heating is desired and it may be advantageous to use an absorption multi-purpose system.

Air Conditioning Mode of Operation

In the air conditioning mode high evaporator 36 and the low evaporator 54 are connected in series heat exchange relationship with the flow of air from the conditioned living space environment (the load).

Figure 4:
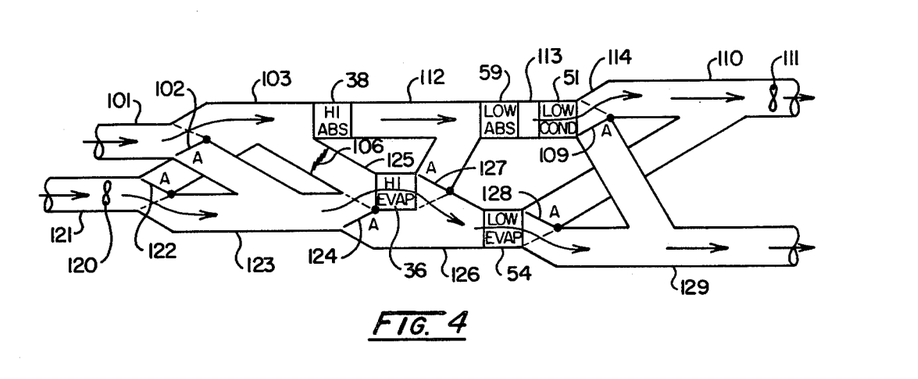
FIG. 4 is an air flow diagram of the various components of the system of this invention when operated in the air conditioning mode shown in FIG. 1.

As shown in FIG. 1, components operating at higher temperatures are shown to the right and components operating at lower temperatures are shown to the left, relative to each other. The load is progressively cooled as it passes across the evaporators 36 and 54 respectively. As shown in FIG. 4, a fan 120 draws air from a living space return duct 121, and with dampers 122 and 124 in the "A" position, forces that air through a duct 123 to the high evaporator 36. With dampers 127 and 128 in the "A" position, house air leaves evaporator 36 and passes through a duct 126, low evaporator 54, and a duct 129 from which it is returned to the conditioned living space.

Outside air is drawn into the system through a duct 101, and with a damper 102 in the "A" position, through duct 103 to high absorber 38. Damper 106 isolates the outside air inlet duct 103 from the interior plenum 125 to high evaporator 36. Flow continues through duct 112 to the low absorber 59, duct 113, and low condenser 51 to duct 114. Damper 109 placed in the "A" position connects duct 114 with the discharge duct 110 which contains the fan 111, that induces the flow of outside air.

As seen in FIGS. 1 and 4, heat from the absorber 38, condenser 51, and absorber 59 is rejected to the outside air (the heat sink) by means of the air flow pattern established across these components.

Figure 8:
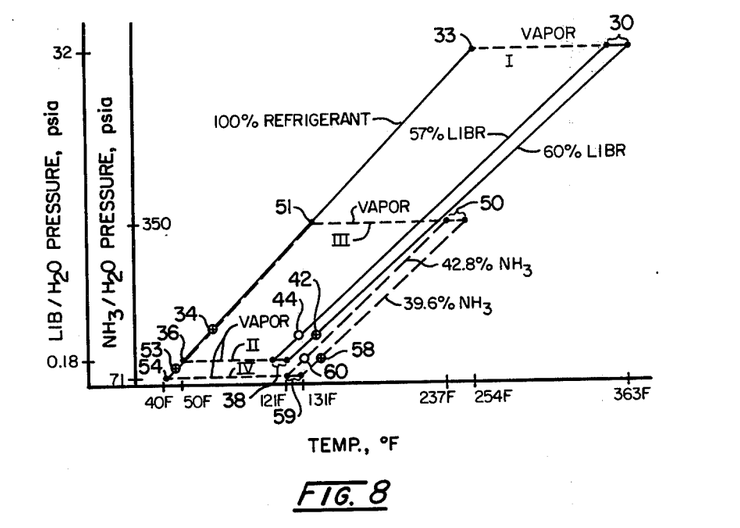
FIG. 8 is a P-T-x diagram illustrating the thermodynamic operation of the system when operated in the modes shown in FIG. 1.

Referring to FIGS. 1 and 8, in the air conditioning mode of the preferred embodiment, a saturation temperature of 254° F. establishes the pressure at 32 psia for operations in chamber I. The desorber 30 receives weak absorbent solution (57% LiBr.) after being heated in the recuperater 40 by the strong absorbent solution leaving the desorber 30 at 60% LiBr and 363° F. In the total system in this mode, only the desorber 30 receives heat from the external source 31.

Saturation conditions at the evaporator 36 establish the pressure of 0.18 Psia and a temperature 50° F. In the absorber 38, the strong absorbent solution enters at a temperature of 121° F. and 60% LiBr equilibrium condition. Heat is rejected to the heat sink which in an air conditioning system, may be the outside ambient atmosphere.

Because the solution pair has been selected for its performance under these conditions, operations are below the crystalization limit and especially advantageous for the heat exchange relationship between condenser 33 and the desorber 50.

A saturation temperature of 140° F. in condenser 51 establishes the pressure at 350 Psia for operations in chamber III with $NH_3/H_2O$ as the lower temperature fluid pair. The desorber 50 receives weak absorbent solution (42.8% NH3) at a temperature of 237° F. and the desorber 50 receives heat from the condenser 33.

Saturation conditions at the evaporator 54 establishes the pressure at 71 psia at temperature 40° F. The absorber 59 receives strong solution at 39.6% NH3 and a temperature of 131° F., discharges weak solution at approximately 121° F., and gives up heat to the heat sink in heat exchange relationship.

The theoretical performance of this cycle is predicted to be: COP=0.96. Taking loses into the account, the actual coefficient of performance is estimated to be 0.88 with a high performance combustor 31.

Warm Ambient Heat Pump Operation

Figure 5:
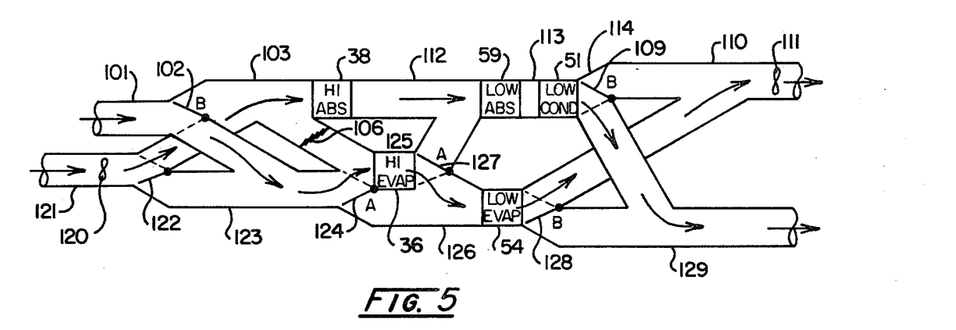
FIG. 5 is an air flow diagram of the various components of the system of this invention when operated in the warm heat pump mode shown in FIG. 1.

When the outside ambient air conditions are about 45° F. and above, heat pump operations are carried out in the same system except that the roles of the ambient and load are reversed as shown in FIG. 5 for a system which is heating or air conditioning.

With dampers 122 and 109 in the "B" position, return air from the living space supplied by fan 120 is diverted to duct 103, high absorber 38, low absorber 59, and low condenser 51 and then returned to the conditioned air exit duct 129. With dampers 102 and 128 also in the "B" position, outside air passes from inlet 101 through high evaporator 36 and low evaporator 54 before being drawn to exit duct 110 by fan 111. Dampers 124 and 127 remain in the "A" position and damper 106 remains closed.

In this circumstance, the ambient outside air as a source of heat is caused to flow across the evaporators 36 and 54 which are arranged in series heat exchange relationship with the air passing across the evaporator 36 of the higher temperature subsystem first. Retaining the series nature of the flow of air across the two evaporators allows the outside air to be cooled to temperatures below freezing without freezing the higher temperature evaporator. At the same time, imposing the return air from the living space atmosphere on the high absorber first allows it to be operated away from crystalization region. Subsequent heating of the living space atmosphere by the absorber 59 and the condenser 51 can be at higher temperatures to minimize the flow of living space air.

Theoretical analysis for this mode and example establishes that, for every unit of heat supplied by the combustion products, 0.96 units of heat can be supplied from the ambient air. When adjusted for its stack loses, the coefficient of performance is equal to or greater than 1.7.

Cold Ambient Heat Pump Operation

At outside ambient air temperatures lower than about 45° F., it is not acceptable to use the higher temperature evaporator 36 to extract heat from the outside air without freezing up the higher temperature refrigerant flow with a H2O/LiBr higher temperature system. To protect the higher temperature evaporator 36 from freezing (and the higher temperature absorber from crystalization) this heat pumping cycle is carried out by imposing rejection heat from the lower temperature subsystem upon the higher temperature evaporator 36.

Figure 2:
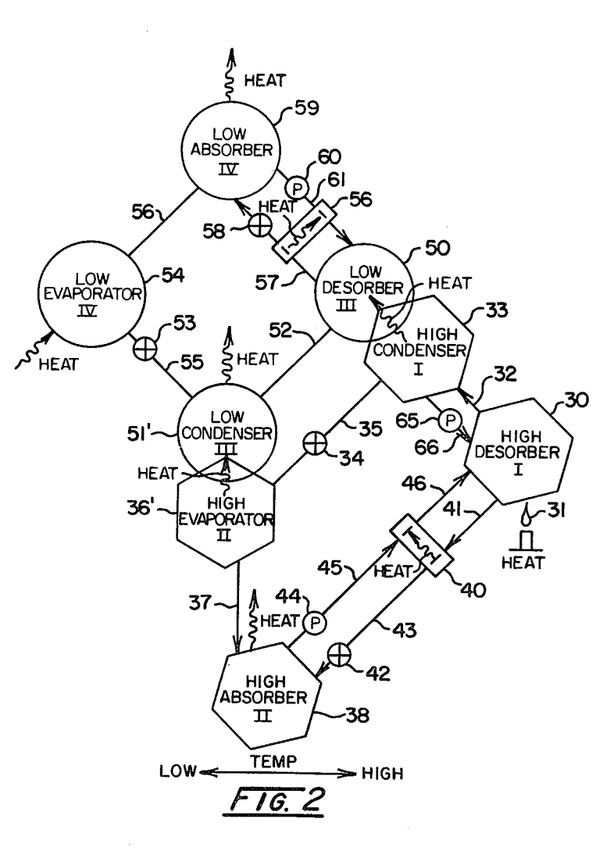
FIG. 2 is a schematic representation of the various components of the system of this invention in the cold ambient heat pump mode of operation.
Figure 6:
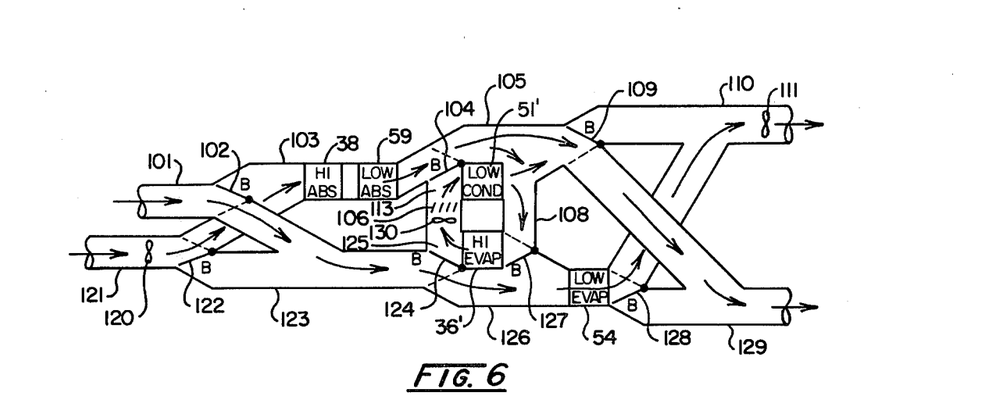
FIG. 6 is an air flow diagram of the various components of the system of this invention when operated in the mode shown in FIG. 2.

Referring to FIG. 2, the system is configured schematically the same as in FIG. 1 except that the evaporator 36' is in heat exchange relationship with the condenser 51'. This is accomplished by causing the air flow to pass across these components as shown in FIG. 6. In order to accomplish this, the ducting configuration is modified as shown in FIG. 6.

Damper valve 106 is located so that it can isolate the condenser inlet 113 and evaporator inlet 125 when closed, but is shown open in FIG. 6, allowing recirculation fan 130 to force a separate flow of air from the high evaporator 36 to the low condenser 51. Dampers 124 and 127 and a damper 104 must be in the "B" position and a duct 108 must be added for this recirculation air flow to occur. As in FIG. 5, dampers 102, 109, 122, and 128 remain in the "B" position.

In addition, a pump 65 is connected from the condenser 33 to the desorber 30 by a conduit means 66, as shown in FIG. 2.

In operation, liquid condensate is pumped from the condenser 33 to the desorber 30 by the pump 65 as necessary to balance the system when the heat rejection from the condenser 51' is made equal to the heat addition to the evaporator 36'. Additional heat is supplied by the source 31 to vaporize the additional liquid condensate that is pumped from the condenser 33 to the desorber 30. This supplies extra heat to the condenser 33 which matches the requirements of desorber 50 in this mode of operation.

Figure 9:
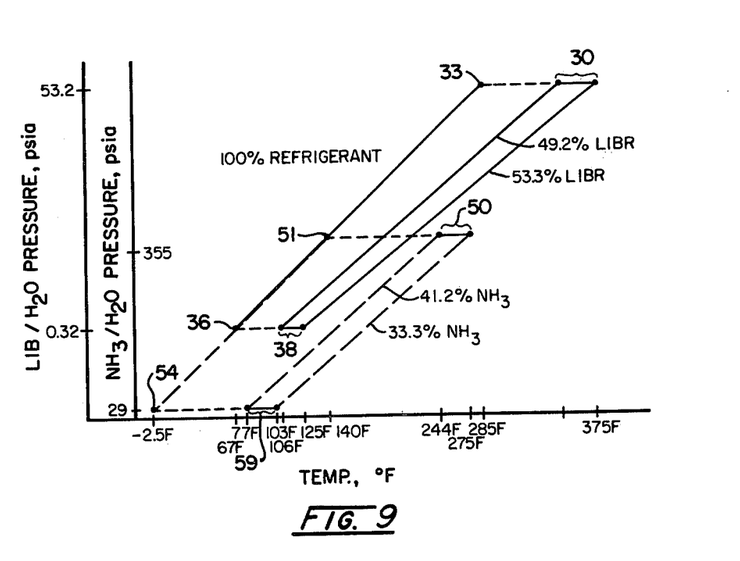
FIG. 9 is a P-T-x diagram illustrating the thermodynamic performance of the system when operated in the modes shown in FIGS. 2 and 3.

Referring to FIGS. 2 and 9, in a preferred example, the condenser 33 operates at a saturation temperature of 285° F. (establishing the chamber I pressure at 53.2 psia) as it gives off heat the desorber 50 operating at a peak solution temperature of 277° F. The desorber 30 receives weak absorbent solution at 49.2% LiBr from the recuperator 40 where it is heated by the strong solution leaving the desorber 30 at 375° F. and 55.3% LiBr.

The absorber 38 receives refrigerant vapor at 0.32 psia from evaporator 36' and strong absorbent solution at 125° F. and 55.3% LiBr from the recuperator 40. As the solution is cooled by rejecting heat to the air in the living space (the load) the leaving solution is at 106° F. and 49.2% LiBr.

The condenser 51' is assumed to operate at 140° F. establishing a pressure of 355° psia in the chamber III. The weak absorbent solution enters the desorber 50 at 244° F. and 41.2% NH3 after being recuperatively heated by the strong absorbent solution leaving the desorber 50 at 277° F. and 33.3% NH3. The air flow heat exchange between the condenser 51' and the evaporator 36' establishes the pressure of chamber II at 0.32 psia. The subsystems are adjusted so that the heat leaving the condenser 51' is equal to that accepted by the evaporator 36'.

In the typical example system, the evaporator 54 is assumed to operate at −2.5° F. establishing 29 psia as the pressure in chamber IV. The evaporator 54 extracts heat from the cold outside air and the surface will need to be defrosted periodically. The low absorber 59 operates at 29 psia as it rejects heat to air in the heated living space (the load). Strong solution enters the absorber 59 at 103° F. and 33.3% NH3 and leaves at 77° F. and 41.2% NH3.

With the refrigerant flow established to match the heat flow between the condenser 51' and the evaporator 36', the desorber 50 requires more heat (about one third more in the example) than would normally be rejected by the condenser 33. This short fall of energy is supplied by additional heat input from the source 31. The energy transfer is accomplished by additional flow of liquid refrigerant from a refrigerant well in condenser 33 to the desorber 30 driven by pump 65. In the desorber 30 it is mixed with the solution supplied by pump 44, accomplishing the desired dilution of the solution flow, and is eventually evaporated by the increased heat flow to supply increased vapor flow to the condenser 33.

This results in a theoretical heating COP=1.33 which would reduce to a value near 1.20 when an adjustment is made for stack and other loses in actual practice.

Figure 7:
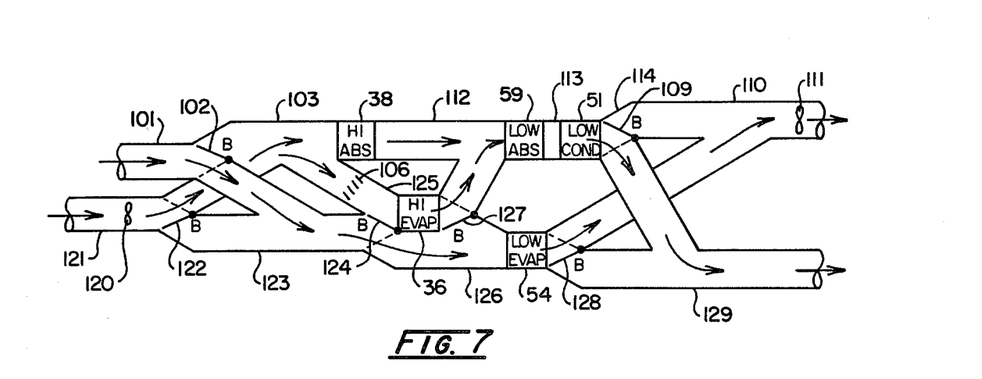
FIG. 7 is an air flow diagram of the various components of the system of this invention when operated in the mode shown in FIG. 3.

From a control point of view, it is advantageous to be freed from having to maintain exact heat flow balances at both the condenser 51' and desorber 50. The preferred method of accomplishing this is to include the evaporator 36' and the condenser 51' in the main flow of air to the heated space as shown in FIG. 7. When balanced, the evaporator 36' cools the return air and the high absorber 38 heats the return air the same amount so that the mixed temperature entering absorber 59 from duct 112 is the same as the temperature in duct 103. When unbalanced, there is a small net gain or loss in return air temperature entering absorber 59.

In FIG. 7, dampers 102, 109, 122, 124, 127, and 128 are in the "B" position and damper valve 106 is open just as in FIG. 6. Fan 130 is eliminated and the air flow losses are reduced.

In the example about 20% of the heat added to the first higher temperature subsystem passes directly to the heated space without causing any heat pump augmentation through the absorber 38. Therefore the only true heat pumping process occurs in the lower temperature second subsystem in this combined mode. Consequently, it is advantageous to increase the relative amount of condensate returned to the desorber 30 from the condenser 33. Various compromises are possible in the adjustment of condensate flow produced by the pump 65 between these components. Those skilled in the art will find it a matter of routine adjustment to determine the appropriate amount under certain operating conditions.

Figure 3:
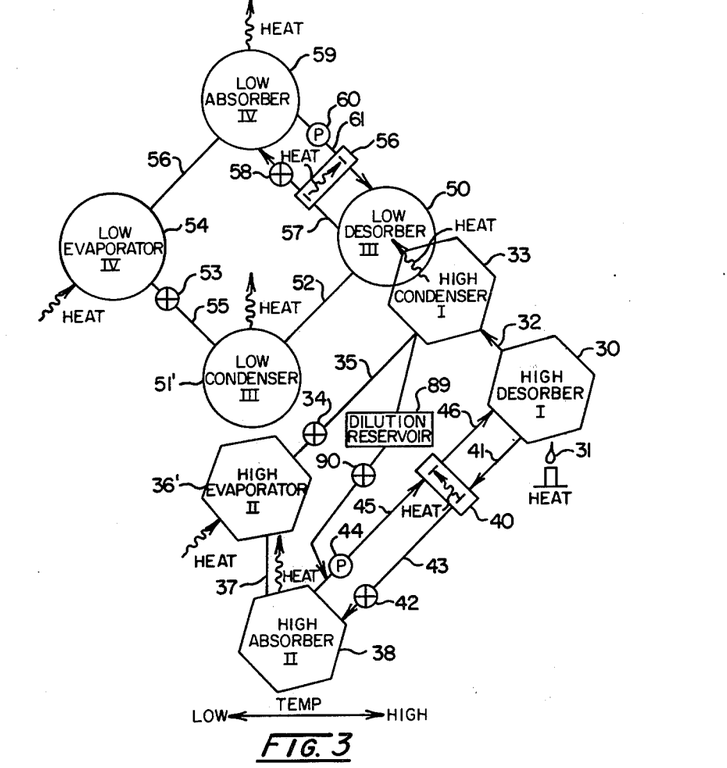
FIG. 3 is a schematic representation of the various components of the system of this invention in another embodiment of the cold ambient heat pump mode of operation.

Referring to FIG. 3, an alternative embodiment of the cold ambient heat pump operation is schematically shown in which the heat input to evaporator 36' is virtually eliminated by closing valve 34 and diverting all the refrigerant flow through a dilution reservoir 89, and directing the refrigerant from there through valve 90 to the inlet to solution pump 44. This further reduces the LiBr concentration, increasing the vapor release from the solution pump flow without excessively broadening the concentration differences across desorber 30, and reducing the temperature in desorber 30. As shown in FIG. 3, some heat flow passes directly from the heat source 31 to the conditioned air by heat transfer from absorber 38.

The net coefficient of performance for heating (C.O.P.$_h$) is therefore increased to about 1.31. This would be the preferred embodiment since it has the potential for the highest (C.O.P.$_h$).

From the foregoing, it is seen that the combination of the various components and their heat exchange relationships is variable in various combinations to achieve an overall refrigeration/heat pump system having an unusually high C.O.P.$_c$ for cooling of 0.88 and an unusually high C.O.P.$_h$ for heating of at least 1.31, in the cold ambient heat pump mode. These performances are accomplished by staging the first subsystem relative to the second subsystem in alternative combinations through rearrangement of the heat flow in the system relative to heat exchange between the heat load and the heat sink.

FIGS. 4, 5, 6, and 7 show various direct heat exchange relationships between the components of the absorption system and the air of the conditioned space (the load) and/or the ambient air (the sink or source). Alternatively, other means may be used to provide the heat exchange in the relationships between these components and the load or sink. For instance, hydronic flow loops (i.e., the use of liquid heat exchange materials such as ethylene glycol conveyed in piping between the components and heat exchangers in contact with the load or sink) could replace any or all of the direct heat exchangers that are between the elements in the four chambers and the load or the ambient. In addition, the pressure flow relationship of high evaporator and high absorber shown in FIG. 7 could alternatively be a series flow relationship, either directly with the conditioned space air flow or with the hydronic flow loops, which delivers heat to the conditioned space.

It is herein understood that although the present invention has been specifically disclosed with the preferred embodiment and examples, modification and variations of the concepts herein disclosed may be resorted to by those skilled in the art. Such modifications and variations are considered to be within the scope of the invention and the appended claims.

What is claimed is:

1. An absorption refrigeration and heating system in connection with a cooling or heating load and a heat sink or source to selectively provide heat to or remove heat from the load, comprising:
   (a) at least one first subsystem for operation at higher temperature and at least one second subsystem for operation at lower temperature relative to the first subsystem;
   (b) each subsystem having components of absorber means, desorber means, condenser means, and evaporator means operatively connected together;
   (c) with the condenser means of the higher temperature subsystem in heat exchange relationship with the desorber means of the lower temperature subsystem; and
   (d) means to selectively arrange heat exchange relationships between the load and at least two of the component means including the higher temperature absorber, higher temperature evaporator, lower temperature condenser, lower temperature evaporator, and lower temperature absorber, while arranging heat exchange relationships between at least one of the other component means and the heat sink or source.

2. A system according to claim 1 in connection with a cooling load, wherein the evaporator of the higher temperature subsystem and the evaporator of the lower temperature subsystem are in series heat exchange relationship with the cooling load.

3. A system according to claim 1 to selectively provide heat to, or remove heat from, a load when an ambient heat sink or source of heat is above about 45° F., wherein:
   the evaporator of the higher temperature subsystem and the evaporator of the lower temperature subsystem are in series heat exchange relationship with the load in the cooling mode, or with the ambient in the heating mode; and
   the absorber of the higher temperature subsystem and the absorber and the condenser of the lower temperature subsystem are in series heat exchange relationship with the sink in the cooling mode or the load in the heating mode.

4. A system according to claim 1 in connection with a load to pump heat from ambient heat sources at a temperature less than about 45° F., wherein:

the absorber of the higher temperature subsystem and the absorber of the lower temperature subsystem are in series heat exchange relationship with the load;

the evaporator of the higher temperature subsystem is in heat exchange relationship with the condenser of the lower temperature subsystem; and means are provided to pump liquid refrigerant from the condenser of the higher temperature subsystem to the desorber of the higher temperature subsystem to balance the heating requirement of the evaporator of the higher temperature subsystem with the heating requirement of the condenser of the lower temperature subsystem.

5. A system according to claim 1 to pump heat from ambient heat sources at a temperature less than about 45° F., wherein:

the absorber of the higher temperature subsystem, the absorber of the lower temperature subsystem, and the condenser of the lower temperature subsystem are in series heat exchange relationship with the load, and the evaporator of the higher temperature subsystem also is in heat exchange relationship with the load; and means are provided to convey liquid refrigerant from the condenser of the higher temperature subsystem to the desorber of the higher temperature subsystem to reduce the direct flow of heat from the heat source to the conditioned space.

6. A system according to claim 1 to pump heat from ambient heat sources at a temperature less than about 45° F., wherein:

the absorber of the lower temperature subsystem and the condenser of the lower temperature subsystem are in series heat exchange relationship with the load;

the evaporator of the higher temperature subsystem is substantially eliminated from cooling the load by reducing the flow of liquid refrigerant to said evaporator;

the absorber of the higher temperature subsystem is in minimal heat transfer relation with the load; and reservoir means are provided to store excess liquid refrigerant from the condenser of the higher temperature subsystem and to control the release of liquid refrigerant to a solution pump in the higher temperature subsystem, to reduce the direct flow of heat from the heat source to the load.

7. A system according to any one of claims 1 through 6 wherein the first subsystem employs a refrigerant-absorbent solution selected for high temperature performance properties and the refrigerant-absorbent solution in the second subsystem is selected for its low temperature performance properties.

8. A system according to any one of claims 1 through 6 wherein the higher temperature subsystem employs an aqueous solution of lithium bromide and water, in which the aqueous solution of lithium bromide is the absorbent and the water is the refrigerant.

9. A system according to any one of claims 1 through 6 wherein the lower temperature subsystem employs a solution of water and ammonia in which the ammonia is the refrigerant and the ammonia water solution is the absorbent.

10. A system according to any one of claims 1 through 6 wherein the lower temperature subsystem employs a solution of water and ammonia in which the ammonia is the refrigerant and the ammonia water solution is the absorbent, and the higher temperature subsystem employs an aqueous solution of lithium bromide and water, in which the aqueous solution of lithium bromide is the absorbent and the water is the refrigerant.

* * * * *